(12) United States Patent
Mordechai et al.

(10) Patent No.: US 11,729,521 B2
(45) Date of Patent: Aug. 15, 2023

(54) SYSTEMS AND METHODS FOR EXTENDED FIELD OF VIEW AND LOW LIGHT IMAGING

(71) Applicant: GM GLOBAL TECHNOLOGY OPERATIONS LLC, Detroit, MI (US)

(72) Inventors: Emanuel Mordechai, Mishmarot (IL); Tzvi Philipp, Bet Shemesh (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 17/194,914

(22) Filed: Mar. 8, 2021

(65) Prior Publication Data
US 2022/0286606 A1    Sep. 8, 2022

(51) Int. Cl.
| | | |
|---|---|---|
| H04N 5/232 | (2006.01) | |
| H04N 23/951 | (2023.01) | |
| G02F 1/29 | (2006.01) | |
| H04N 7/18 | (2006.01) | |
| G06T 5/50 | (2006.01) | |
| H04N 3/14 | (2006.01) | |
| H04N 23/80 | (2023.01) | |
| H04N 23/698 | (2023.01) | |
| H04N 23/741 | (2023.01) | |

(52) U.S. Cl.
CPC .......... *H04N 23/951* (2023.01); *G02F 1/292* (2013.01); *G06T 5/50* (2013.01); *H04N 3/155* (2013.01); *H04N 7/18* (2013.01); *H04N 23/698* (2023.01); *H04N 23/741* (2023.01); *H04N 23/80* (2023.01); *G02F 2203/24* (2013.01)

(58) Field of Classification Search
CPC ...... G06T 5/50; H04N 3/155; H04N 5/23229; H04N 5/23232; H04N 5/23238; H04N 5/2355; H04N 7/18
See application file for complete search history.

(56) References Cited

U.S. PATENT DOCUMENTS

| | | | | |
|---|---|---|---|---|
| 2015/0070523 | A1* | 3/2015 | Chao ................ | G06T 5/50 348/218.1 |
| 2016/0018524 | A1* | 1/2016 | Zeng ................ | G01S 17/87 356/4.01 |
| 2019/0004496 | A1* | 1/2019 | Blom ................ | G01B 11/02 |
| 2021/0351222 | A1* | 11/2021 | McGarvey ........ | H01L 31/02325 |

FOREIGN PATENT DOCUMENTS

CN     108957900 A    * 12/2018

* cited by examiner

*Primary Examiner* — Md N Haque
(74) *Attorney, Agent, or Firm* — Lorenz & Kopf LLP

(57) ABSTRACT

Systems and method are provided for generating an image of an environment of a vehicle. In one embodiment, a method includes: determining, by a processor, a first position of a plurality of positions within a first field of view; controlling, by the processor, a discrete scanning device based on the first position; capturing, by an imaging device, pixel data for a plurality of pixels within a second field of view associated with the first position, wherein the second field of view is within the first field of view; and combining, by the processor, the pixel data from the second field of view with pixel data captured from a third field of view associated with one of the plurality of positions to form image data depicting the environment of the vehicle.

10 Claims, 4 Drawing Sheets

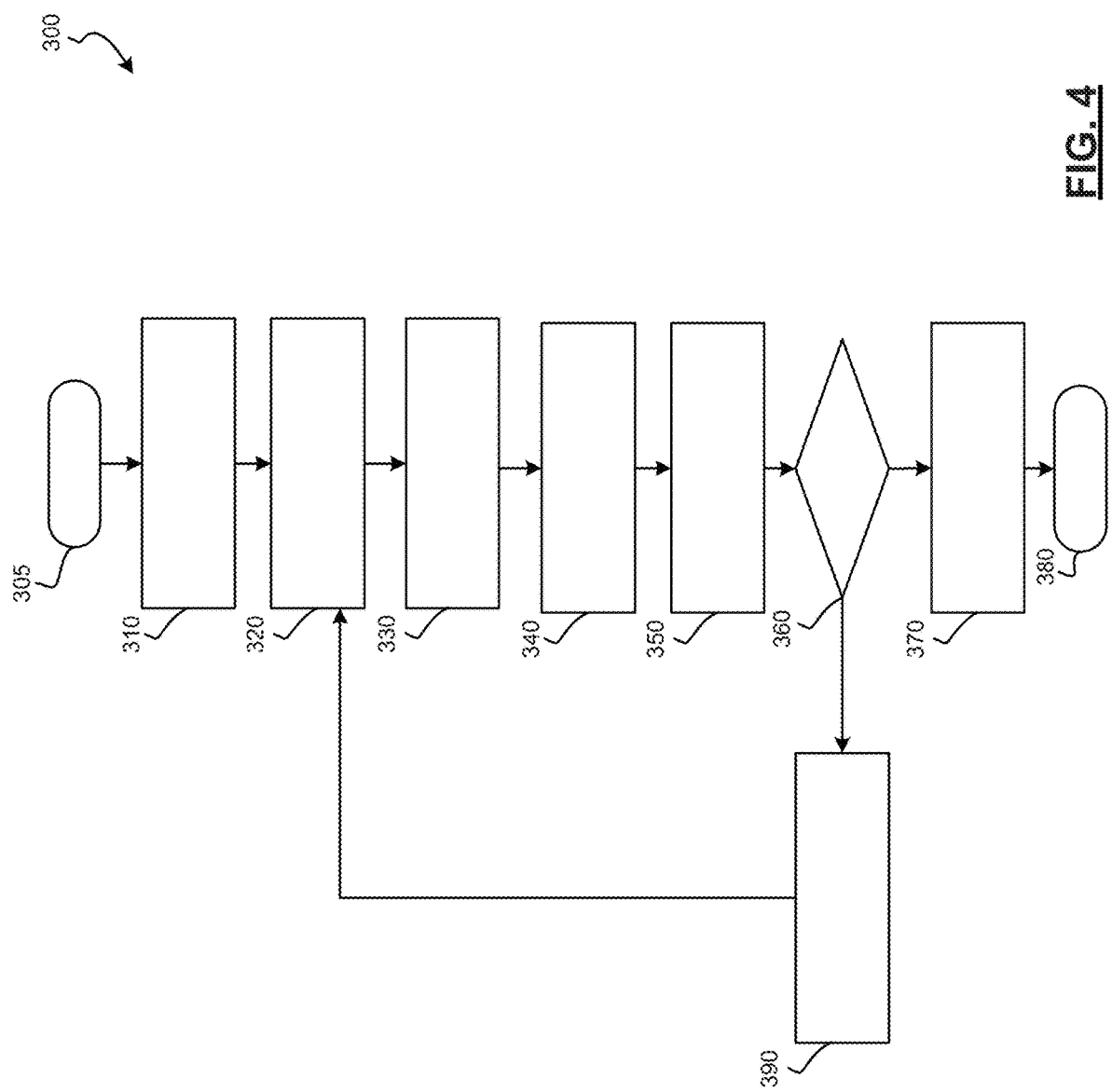

SYSTEMS AND METHODS FOR EXTENDED FIELD OF VIEW AND LOW LIGHT IMAGING

INTRODUCTION

The present disclosure generally relates to sensors, and more particularly relates to systems and methods for providing images of an environment of, for example, a vehicle.

Image sensors, such as cameras, are used in autonomous vehicles to capture reflected ambient light from a scene and digitize the reflection to form a high-resolution image. The high-resolution image is then processed to predict elements within the scene and control the vehicle based thereon.

While recent years have seen significant advancements in image sensors, such systems might still be improved in a number of respects. For example, the quality of the digitized image can be improved for low light level conditions or dynamic intra-scene scenarios. In another example, the field of view and resolution can be improved. Accordingly, it is desirable to provide systems and methods for improving sensor systems. Furthermore, other desirable features and characteristics of the present disclosure will become apparent from the subsequent detailed description and the appended claims, taken in conjunction with the accompanying drawings and the foregoing technical field and background.

SUMMARY

Systems and method are provided for generating an image of an environment of a vehicle. In one embodiment, a method includes: determining, by a processor, a first position of a plurality of positions within a first field of view; controlling, by the processor, a discrete scanning device based on the first position; capturing, by an imaging device, pixel data for a plurality of pixels within a second field of view associated with the first position, wherein the second field of view is within the first field of view; and combining, by the processor, the pixel data from the second field of view with pixel data captured from a third field of view associated with one of the plurality of positions to form image data depicting the environment of the vehicle.

In various embodiments, the discrete scanning device includes one or more liquid crystal phase plates and one or more polarized gratings.

In various embodiments, the plurality of positions is based on a number of the one or more liquid crystal phase plates.

In various embodiments, the plurality of position is based on performance characteristics of the liquid crystal phase plates.

In various embodiments, the imaging device includes a two-dimensional array of single-photon avalanche diodes.

In various embodiments, the capturing the pixel data comprises counting and arrival time recording.

In various embodiments, the capturing the pixel data includes determining an irradiance by fitting histogram data to a statistical model of photon flux.

In various embodiments, the capturing the pixel data further applying a bandpass filter to the irradiance to at least one of narrow a spectral bandwidth, regulate optical transmission, adjust incoming scene light, and set a spectral regime.

In various embodiments, the method further includes maintaining the first position of the discrete scanning device for a predetermined time period to enable the capturing of the pixel data for the plurality of pixels.

In various embodiments, the combining includes stitching pixels from the second field of view with pixels from the third field of view.

In another embodiment, a system includes: a discrete scanning device; an imaging device coupled to the discrete scanning device; and a control module configured to, by a processor, determine a first position of a plurality of positions within a first field of view, control the discrete scanning device based on the first position, capture pixel data from the imaging device, the pixel data comprising a plurality of pixels within a second field of view associated with the first position, the second field of view is within the first field of view, and combine the pixel data from the second field of view with pixel data captured from a third field of view associated with one of the plurality of positions to form image data depicting the environment of the vehicle.

In various embodiments, the discrete scanning device includes one or more liquid crystal phase plates and one or more polarized gratings.

In various embodiments, the plurality of positions is based on a number of the one or more liquid crystal phase plates.

In various embodiments, the plurality of position is based on performance characteristics of the liquid crystal phase plates.

In various embodiments, the imaging device includes a two-dimensional array of single-photon avalanche diodes.

In various embodiments, the control module is configured to capture the pixel data by counting and arrival time recording.

In various embodiments, the control module is configured to capture the pixel data by determining an irradiance by fitting histogram data to a statistical model of photon flux.

In various embodiments, the control module is configured to capture the pixel data by applying a bandpass filter to the irradiance to at least one of narrow a spectral bandwidth, regulate optical transmission, adjust incoming scene light, and set a spectral regime.

In various embodiments, the control module is further configured to maintain the first position of the discrete scanning device for a predetermined time period to enable the capturing of the pixel data for the plurality of pixels.

In various embodiments, the control module is configured to combine by stitching pixels from the second field of view with pixels from the third field of view.

BRIEF DESCRIPTION OF THE DRAWINGS

The exemplary embodiments will hereinafter be described in conjunction with the following drawing figures, wherein like numerals denote like elements, and wherein:

FIG. 4 is a flowchart illustrating a control method for generating an image, in accordance with various embodiments.

DETAILED DESCRIPTION

The following detailed description is merely exemplary in nature and is not intended to limit the application and uses.

Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
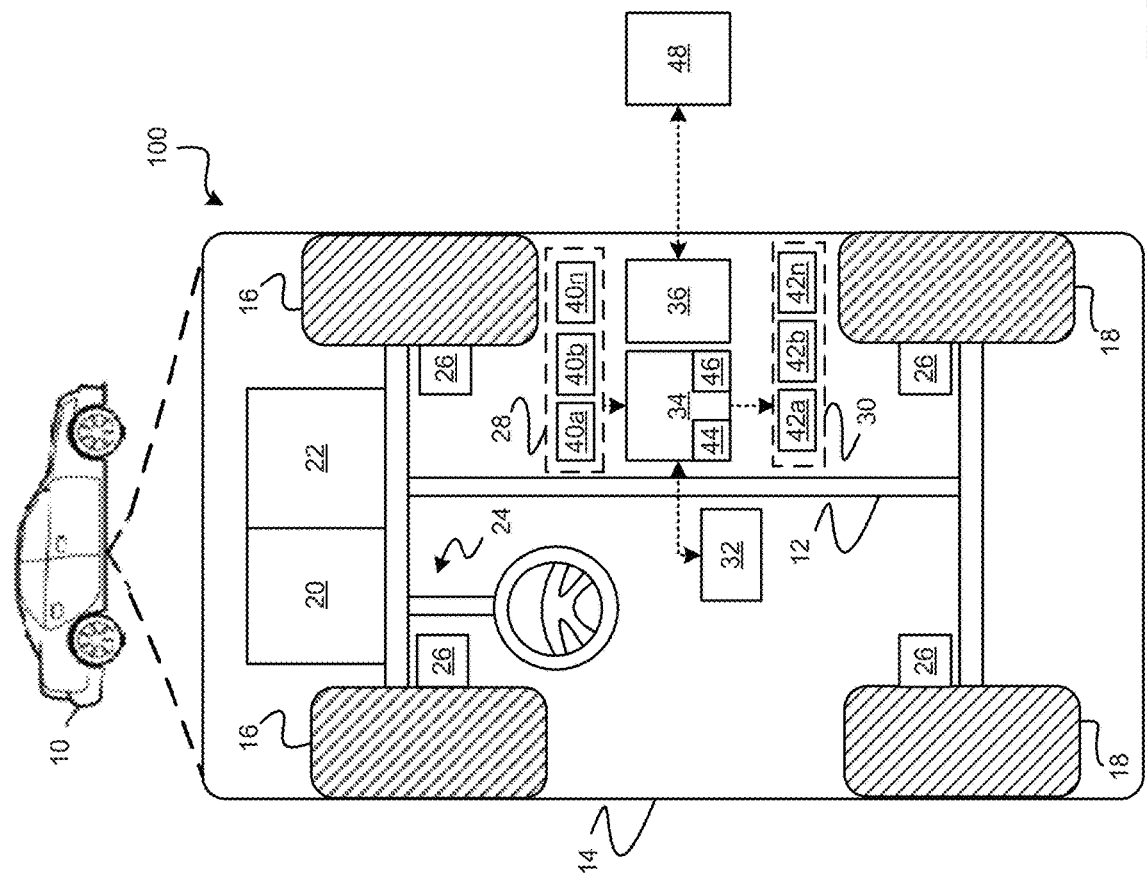
FIG. 1 is a functional block diagram illustrating an autonomous vehicle having a sensor system, in accordance with various embodiments.

With reference to FIG. 1, a sensor system shown generally at 100 is associated with a vehicle 10 in accordance with various embodiments. As will be discussed in more detail below, the sensor system 100 continuously monitors an environment of the vehicle 10 and captures a digitized image of the monitored environment. A control system of the vehicle uses the digitized image to control one or more operations of the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the sensor system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is autonomous in that it provides partial or full automated assistance to a driver operating the vehicle 10. As used herein the term operator is inclusive of a driver of the vehicle 10 and/or an autonomous driving system of the vehicle 10.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. In various embodiments, one or more of the sensing devices 40a-40n are embodied in the sensor system 100 in accordance with various embodiments.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
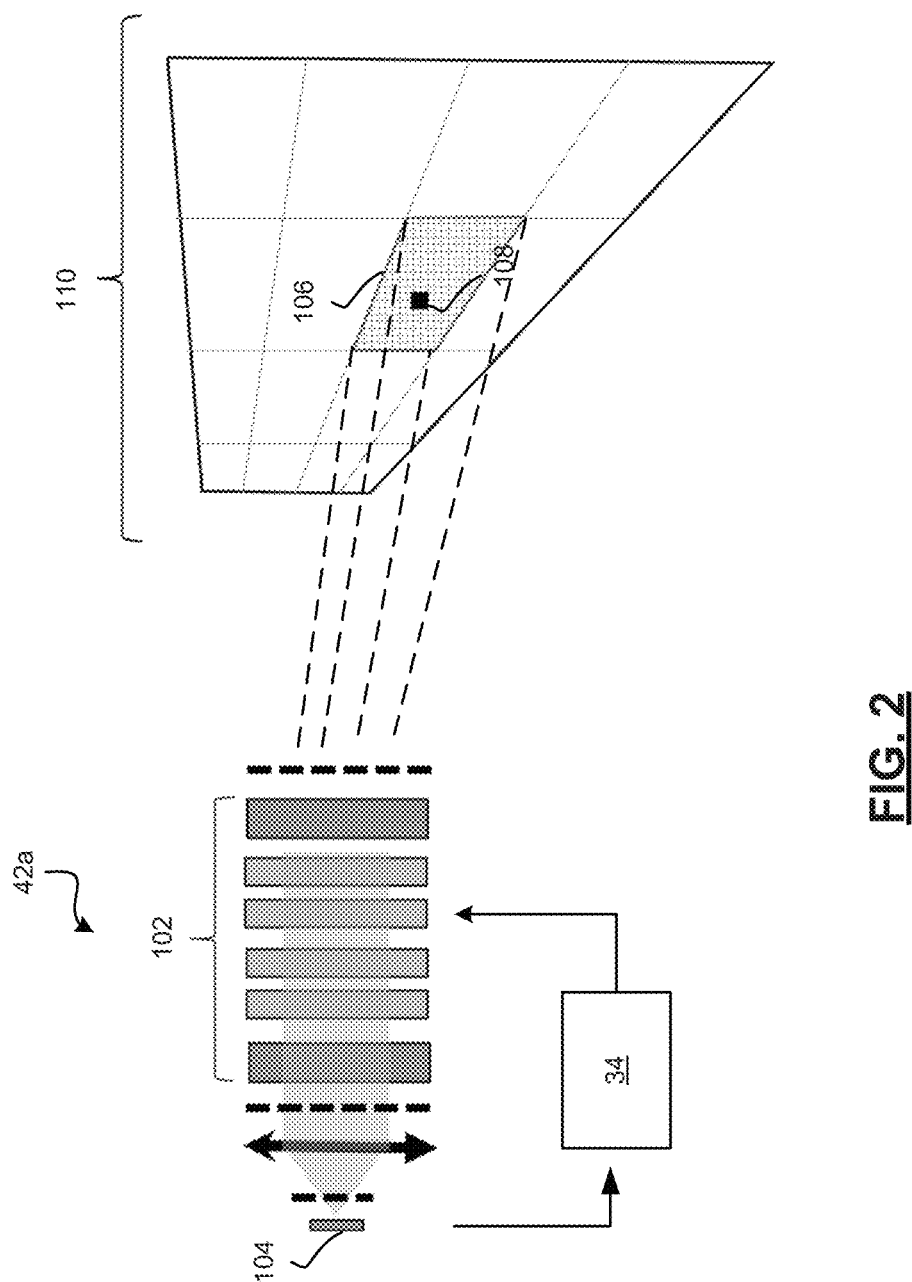
FIG. 2 is a functional block diagram illustrating a sensor of the sensor system, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate by communication messages over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the sensor system 100. The instructions, when executed by the processor 44, control one or more features of a sensing device 40a-40n based on a step and stare mode in order to capture a digitized image of the environment. The digitized image provides extended field-of-of view, high resolution, and low light level imaging performance. The improved digitized image provides for enhanced control of operation of the autonomous vehicle 10.

As can be appreciated, the subject matter disclosed herein provides certain enhanced features and functionality to what may be considered as a standard or baseline autonomous vehicle 10 and/or an autonomous vehicle based remote transportation system. To this end, an autonomous vehicle and autonomous vehicle based remote transportation system can be modified, enhanced, or otherwise supplemented to provide the additional features described in more detail below.

With reference now to FIG. 2, in various embodiments, the sensing device 40a of the sensor system 100 combines a discrete solid-state scanner with an imaging device to capture images using passive illumination. For example, in various embodiments the discrete scanner includes liquid crystal phase plates and polarized gratings, referred to as a LCPG scanner 102; and the imaging device includes a photon-counting two dimensional (2D) array of single-photon avalanche diodes (SPADs), referred to as a 2D SPAD array 104. The LCPG scanner 102 is controlled by the control module 34 to allow the 2D SPAD array 104 to capture image data through passive scene exposure. The control module 34 receives the captured image data and generates an image depicting a scene of the environment.

In various embodiments, the LCPG scanner 102 is controlled to various angular positions in order to capture, via the 2D SPAD array 104, a number of narrow instantaneous field of views (iFOV) 106 having a plurality of SPAD pixels 108. In various embodiments, the number of positions and thus, the number of captured iFOVs 106 is equal to $2^N$, where N represents the number of stacks. A stack is defined as a liquid crystal phase plate combined with a polarized grating. Multiple gratings can be combined with one phase plate. The number of stacks may be limited by system performance characteristics of the liquid crystal phase plates.

The LCPG scanner 102 is controlled by voltages that define the angle where the LCPG scanner 102 will be directed. As will be discussed in more detail with regard to FIGS. 3 and 4, the controller 34 of the system 100 is programmed to sequentially command the voltages to the LCPG scanner 102 such that the angular range progresses in either an ascending or descending order as a function of the voltage values supplied. Alternatively, the voltages can be commanded in a random order where no preferential order of the angles are desired.

In various embodiments, the control module 34 of the system 100 is programmed to command the voltages based on a "step and stare" mode. According to the "step and stare" mode, the position of the LCPG scanner 102 is maintained for a period of time (i.e., "stare" time, integration time), to allow passive scene exposure, thus enabling iFOV imaging with the 2D SPAD array 104. The iFOV images 106 are tiled based on their location such that a resulting image mosaic 110 covers a wide field of view (WFOV), with the high resolution of the narrow instantaneous field of view (iFOV). Each iFOV 106 is designed to have an overlap with neighboring iFOVs, to allow for constructing a continuous image across the WFOV 110.

Figure 3:
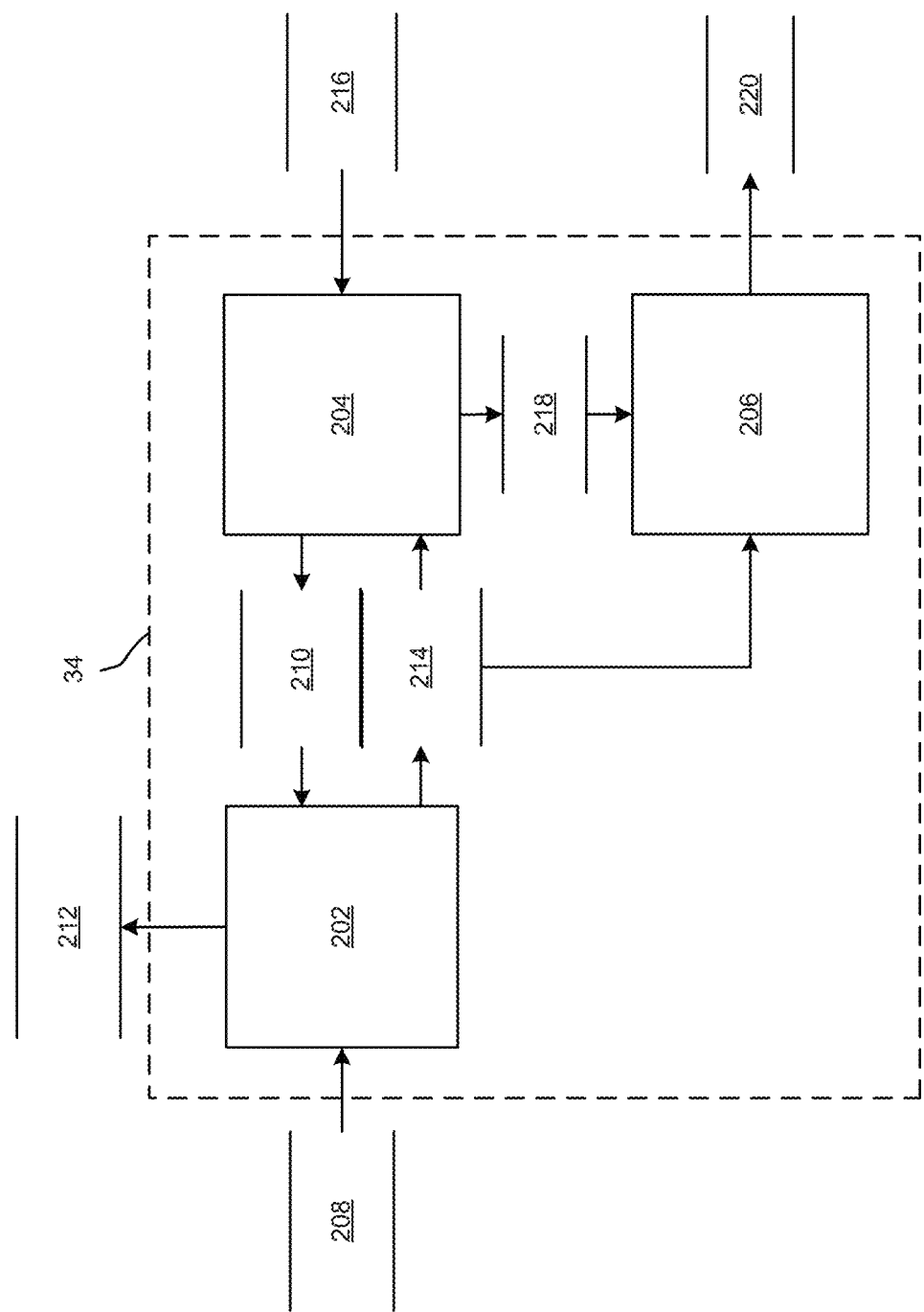
FIG. 3 is a dataflow diagram illustrating a control module of the sensor system, in accordance with various embodiments.

Referring now to FIG. 3, and with continued reference to FIG. 1-2, a dataflow diagram illustrates various embodiments of the control module 34 coupled to the sensing device 40a of FIG. 2. Various embodiments of the control module 34 according to the present disclosure may include any number of sub-modules. As can be appreciated, the sub-modules shown in FIG. 3 may be combined and/or further partitioned to similarly generate image data depicting a scene of the environment. Inputs to the control module 34 may be received from the sensing device 40a or received from other control modules (not shown) of the vehicle 10, and/or determined by other sub-modules (not shown) of the control module 34. In various embodiments, the control module 34 includes a step control module 202, a stare control module 204, and an image determination module 206.

In various embodiments, the step control module 202 controls the stepping of the LCPG scanner through each iFOV 106 of the WFOV 110. For example, the step control module 202 receives position data 208, and stare status data 210. The position data 208 indicates a current angular position of the LCPG scanner 102. The stare status data 210 indicates a current status of capturing the iFOV 106.

In various embodiments, the step control module 202 determines a next angular position of the LCPG scanner 102 based on the position data 208, and the stare status data 210. For example, once the stare status data 210 indicates that the iFOV 106 has been captured for the current position/step and the current position/step is not the last position in the WFOV 110, the step control module 202 determines a next angular position of the LCPG scanner 102 and generates position control data 212 and scan status data 214 based thereon. The step control module 202 updates the scan status data 214 to indicate whether the scan of the WFOV 110 is complete (e.g., stare status indicates complete for all iFOV 106 in the WFOV 110) or whether capturing of an iFOV 106 at the new position should occur.

In various embodiments, the stare control module 204 receives the scan status data 214. When the scan status data 213 indicates that capturing of the iFOV 106 should occur, the stare control module 204 captures pixel data 216 for each pixel in the iFOV 106 at the position indicated by the scan status data 214. For example, in various embodiments iFOV data 218 includes imaging of each of the pixels based on photon counting and arrival time recording ("events" counting), followed by computations and filtering that derive the equivalent pixel irradiance.

For example, in various embodiments the irradiance is determined by fitting histogram data to a statistical model of photon flux (based on a known probability density function) and knowledge of the pixel characteristics. In various embodiments, the wavelength spectral response is limited by a narrow bandpass filter (BPF) to: (a) narrow the spectral bandwidth (BW) of the irradiance to the minimal BW required for proper function of the LCPG-based scanner; (b) regulate the total system optical transmission and hence control the working point of the photon flux and the respective DR; (c) adjust the filtered incoming scene light to the SPAD spectral QE curve; and/or (d) set the imaging system to the required spectral regime, for example, in the visible or NIR or SWIR domains (~0.4÷2 μm).

The image determination module 206 receives the scan status data 214 and the iFOV data 218. Once the scan status data 214 indicates that the scan of the WFOV 110 is complete, the image determination module 206 processes the iFOV data 218 from each position within the WFOV 110 to produce image data 220 depicting the scene of the environment. In various embodiments, the iFOV data 218 includes data for overlapping pixels. In such embodiments, the image determination module 206 stitches the overlapping pixels to produce a continuous image.

Referring now to FIG. 4, and with continued reference to FIGS. 1-3, a flowchart illustrates a control method 300 that can be performed by the system 100 of FIGS. 1-3 in accordance with the present disclosure. As can be appreciated in light of the disclosure, the order of operation within the method is not limited to the sequential execution as illustrated in FIG. 4 but may be performed in one or more varying orders as applicable and in accordance with the present disclosure. In various embodiments, the method 300 can be scheduled to run based on one or more predetermined events, and/or can run continuously during operation of the autonomous vehicle 10.

In one example, the method may begin at 305. The new frame WFOV is initialized (i=1) at 210. The LCPG scanner 102 is controlled to corresponding position i out of 2^N possible positions at 320. The 2D SPAD array 104 is set to capture the current iFOV scene over a pre-defined time period (e.g., integration time) at 330. The detection events are counted per each pixel in the 2D SPAD array 104 at 340. The pixel level equivalent irradiance is determined based on a known inverse non-linear mapping of photon count to flux levels and filtering as discussed above at 350.

Thereafter, the position i is evaluated at 360. When the position i indicates that last iFOV 106 in the WFOV 110, the iFOV acquisition is ended and the image data 220 is generated at 370. The method 300 may end at 380.

When the position i indicates that last iFOV 106 in the WFOV 110 has not been processed at 360, the position i is updated at 380 and the method 300 continues with controlling the LCPG scanner 102 to the corresponding position i and capturing the iFOV scene at 330. The method 300 continues to loop until the position i indicates that last iFOV 106 in the WFOV 110.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of generating an image of an environment of a vehicle, comprising:

determining, by a processor, a first position of a plurality of positions within a first field of view, wherein the plurality of positions is based on a number of and performance characteristics of one or more liquid crystal phase plates of the discrete scanning device;

controlling, by the processor, movement of a discrete scanning device based on the first position, wherein the controlling is based on a predetermined time period, wherein the discrete scanning device includes the one or more liquid crystal phase plates and one or more polarized gratings;

capturing, by an imaging device associated with the discrete scanning device, pixel data for a plurality of pixels within a second field of view associated with the first position, wherein the second field of view is within the first field of view, wherein the imaging device includes a two-dimensional array of single-photon avalanche diodes; and combining, by the processor, the pixel data from the second field of view with pixel data captured from a third field of view associated with one of the plurality of positions to form image data depicting the environment of the vehicle.

2. The method of claim 1, wherein the capturing the pixel data comprises counting and arrival time recording.

3. The method of claim 1, wherein the capturing the pixel data comprises determining an irradiance by fitting histogram data to a statistical model of photon flux.

4. The method of claim 3, wherein the capturing the pixel data further comprises applying a bandpass filter to the irradiance to at least one of narrow a spectral bandwidth, regulate optical transmission, adjust incoming scene light, and set a spectral regime.

5. The method of claim 1, wherein the combining comprises stitching pixels from the second field of view with pixels from the third field of view.

6. A system for generating an image of an environment of a vehicle, comprising:
- a discrete scanning device that includes one or more liquid crystal phase plates and one or more polarized gratings;
- an imaging device coupled to the discrete scanning device, wherein the imaging device includes a two-dimensional array of single-photon avalanche diodes; and
- a control module configured to, by a processor, determine a first position of a plurality of positions within a first field of view, wherein the plurality of positions is based on a number of and performance characteristics of the one or more liquid crystal phase plates of the discrete scanning device, control movement of the discrete scanning device based on the first position and a predetermined time period, capture pixel data from the imaging device, the pixel data comprising a plurality of pixels within a second field of view associated with the first position, the second field of view is within the first field of view, and combine the pixel data from the second field of view with pixel data captured from a third field of view associated with one of the plurality of positions to form image data depicting the environment of the vehicle.

7. The system of claim 6, wherein the control module is configured to capture the pixel data by counting and arrival time recording.

8. The system of claim 6, wherein the control module is configured to capture the pixel data by determining an irradiance by fitting histogram data to a statistical model of photon flux.

9. The system of claim 8, wherein the control module is configured to capture the pixel data by applying a bandpass filter to the irradiance to at least one of narrow a spectral bandwidth, regulate optical transmission, adjust incoming scene light, and set a spectral regime.

10. The system of claim 6, wherein the control module is configured to combine by stitching pixels from the second field of view with pixels from the third field of view.

* * * * *